United States Patent [19]

Horn et al.

[11] 4,417,448

[45] Nov. 29, 1983

[54] MEANS FOR PRODUCING AN OPTIMIZED COOLER EXPANDER WAVEFORM

[75] Inventors: Stuart B. Horn, Fairfax; Richard A. Wright, Falls Church; Mark S. Asher, Blacksburg, all of Va.

[73] Assignee: The United States of America as represented by the Secretary of the Army, Washington, D.C.

[21] Appl. No.: 341,028

[22] Filed: Jan. 20, 1982

[51] Int. Cl.³ .......................... F25B 9/00; H02K 33/14
[52] U.S. Cl. ............................................. 62/6; 310/35; 318/128
[58] Field of Search ....................... 62/6; 60/518, 519; 310/14, 30, 35; 318/128, 132

[56] References Cited

U.S. PATENT DOCUMENTS

| | | | |
|---|---|---|---|
| 2,568,757 | 9/1951 | Mesh | 310/30 |
| 2,657,552 | 11/1953 | Jonkers et al. | 62/6 |
| 3,119,940 | 1/1964 | Pettit et al. | 310/30 |
| 3,331,239 | 7/1967 | Larsen et al. | 318/128 X |
| 3,991,586 | 11/1976 | Acord | 62/6 |
| 4,235,153 | 11/1980 | Rinde et al. | 310/14 X |
| 4,362,024 | 12/1982 | Winkler | 62/6 |

Primary Examiner—Albert J. Makay
Assistant Examiner—Harry Tanner
Attorney, Agent, or Firm—Robert P. Gibson; Milton W. Lee; Max L. Harwell

[57] ABSTRACT

A means for producing an optimized cooler expander waveform for a closed cycle cryogenic cooler. The cooler displacer is driven by magnetic and spring biasing means through four repeated phases of each cycle to produce four portions of the optimized cooler waveform in which each portion takes up about 25% of the total cycle. The portions are comprised of a constant velocity in opposite direction and dwell times with smoothed corner transitions between each portion. Control means for controlling the displacer movement to produce the specific waveform may be provided by a function generator applying the desired waveform into a displacer control drive circuit which has as a second input a sensory signal of the actual position of the displacer. The actual position and the desired position are continuously compared while the drive circuit drives two opposing solenoids during the constant velocity phases of the displacer movement with two spring biasing means holding the displacer during the dwell times at the end of each stroke.

6 Claims, 8 Drawing Figures

MEANS FOR PRODUCING AN OPTIMIZED COOLER EXPANDER WAVEFORM

The invention described herein may be manufactured, used, and licensed by the U.S. Government for governmental purposes without the payment of any royalties thereon.

BACKGROUND OF THE INVENTION

1. Field of the Invention

The invention is in the field of producing an optimized cooler expander waveform to improve the coefficient of performance of cryogenic coolers.

2. Description of the Prior Art

Cryogenic coolers are inefficient at temperatures below 100° K. Many attempts have been made to improve the efficiency down to and below liquid nitrogen temperatures. At 10° K., the problem is even worse since heat exchange materials operate very poorly at that temperature. The Stirling cycle has achieved the highest efficiency cooler operations. However, further improvements are needed to miniaturize these cryogenic coolers to improve the coefficient of performance (COP), i.e. the watts input power to watts output power, at the very low temperatures. Both the compressor and displacer in either the integral or split free displacer Stirling cycle cooler are sinusoidal in motion. Thermodynamically, the sinusoidal wave is not the most efficient waveform to use.

SUMMARY OF THE INVENTION

The present means for producing an optimized waveform for increased efficiency has been found to improve the COP of coolers as much as 35%. The waveform pressure waves are controlled by a control means to provide a different displacer-expander waveform from the sinusoidal waves presently being used in the integral Stirling cooler or the constant velocity wave used on the free displacer cycles. The optimized waveform has constant velocity during the first portion of the stroke, an upper flat dwell time portion, and equal and opposite constant velocity during the return portion stroke, and a lower flat dwell time portion. The upper and lower flat portions are called dwell times since the displacer-expander actually stops during the times at opposite ends of the reciprocating strokes and are held by the combined effects of a magnetic driving means comprised of two opposing solenoids and a spring biasing means. The constant and equal velocity portions are provided by the amount of current alternately flowing through the two opposing solenoids. The upper and lower dwell times are provided by extending the current flow through the solenoids by the optimized waveform control from the control means. Sinusoidal pressure waves in the cooling gas, or fluid, which is provided by compressor means workably connected by feed line to the closed cycle cryogenic coolers are also synchronized with the magnetic driving means and spring biasing means in movement of the displacer to provide the controlled waveform as explained herein above. The sinusoidal pressure waves provide smooth transitions between the four portions. These smooth transitions with each of the four portions being about 25% of a complete cycle have been found to provide maximum COP for coolers.

The preferred embodiment of the expander waveform producing means of the present invention has a driving means that is controlled by a control means for selectively controlling the motion of the displacer-expander in the desired waveform pattern. The driving means is comprised of the magnetic driving means of a magnetic disc hard connected to the displacer shaft between the two opposing solenoids and the spring biasing means, which is comprised of two biasing springs with one on each side of the magnetic disc. Each solenoid has an initial surge of current that accelerates the displacer in an opposing direction, i.e. one accelerates while the other decelerates, according to the amount of current generated therethrough from the control means while each of the two biasing springs constantly maintain bias on the displacer in opposite directions. The driving means is positioned inside a magnetic drive unit at the ambient end of the cooler.

The control means, which controls the driving means, is comprised of a displacer motion control electronics circuit having an input thereto from a peak pressure pick up means in the feed line between the compressor means and the cooler to trigger a waveform generator preprogrammed to produce the desired optimized voltage waveforms therefrom controlling the drive of the two solenoids. Another input from a sensor positioned in the spring volume end of the magnetic drive unit continuously senses the actual position of the driven displacer during its reciprocal movement to produce sensor waveforms for comparison with the optimized voltage waveforms from the waveform generator in the displacer motion control electronics circuit. The output of the electronics circuit drives the two opposing solenoids to correct for any misdirection in the driven displacer as sensed by the sensor, or if there is no misdirection the output of the electronics circuit of the control means continues to control the drive of the two solenoids by applying the optimized voltage waveforms thereto. The displacer motion is thus maintained in the desired pattern of the optimized waveform if there is no sensed misdirection or in combination with the sensor out to counteract any actual displacer misdirection.

The sensor may be comprised of a magnetoresistor assembly or a differential coil, either of which senses a varying magnetic signal from a magnetic slug of material connected to the displacer shaft in the pneumatic volume. The magnetic slug of material has a N-pole and a S-pole thereon that continuously causes a changing magnetic flux in the magnetoresistors or in the differential coil to produce induced voltage waveforms therefrom. Outputs from the sensor have a voltage waveform exactly the same as the optimized voltage waveform from the waveform generator if the displacer does not have any misdirection, and is generally only shifted in time if there is misdirection. The peak pressure pick up means is preferably a pressure transducer in the feed line that triggers a peak voltage from the transducer to the waveform generator. The waveform generator, which may be a function generator or a breadboarded signal generator which will produce and ensure the proper waveform control signals to the solenoids, produces the originally desired phased and shaped optimized waveform. The peak of the pressure wave in the feed line leads the center of the upper flat dwell portion of the optimized waveform by 90°. Synchronization of the sinusoidal pressure waves with the desired optimized waveform for displacer movement may also be accomplished by an electrical pickoff from the compressor motor being applied to the waveform generator.

Thermodynamically, the present controlled cooler expander waveform provides a much quicker expansion of the working gas during the constant velocity expansion stroke and increases the dwell time at the completions of both the expansion and compression strokes of the expander. This quick expansion of the cooling gas allows for less pressure leakage around the closed cycle cooler, thus increasing greatly the gross cooling capacity. Also, the increase in dwell time to an optimum point gives the generator enough time to more efficiently reject the heat. Tradeoffs are made in the losses since some losses, such as total pressure drop, are less while other losses, such as pumping loss, are degraded. When all losses are considered in the present system there is a slight increase in the total losses. However, the present motion patterns for driving the displacer-generator improves the gross cooling so much that the increased loss is negated and the net cooling capacity for a typical split Stirling cooler is increased to a COP of about 30% or more.

It is further anticipated that electronic position control means could eventually be used with a linear motor wherein the linear motor directly controls the movement of the displacer in a selected motion, and thus eliminates the use of solenoids and springs.

The invention will be better understood with reference to the detailed description in view of the following figures.

DETAILED DESCRIPTION OF THE PREFERRED EMBODIMENT

Figure 1:
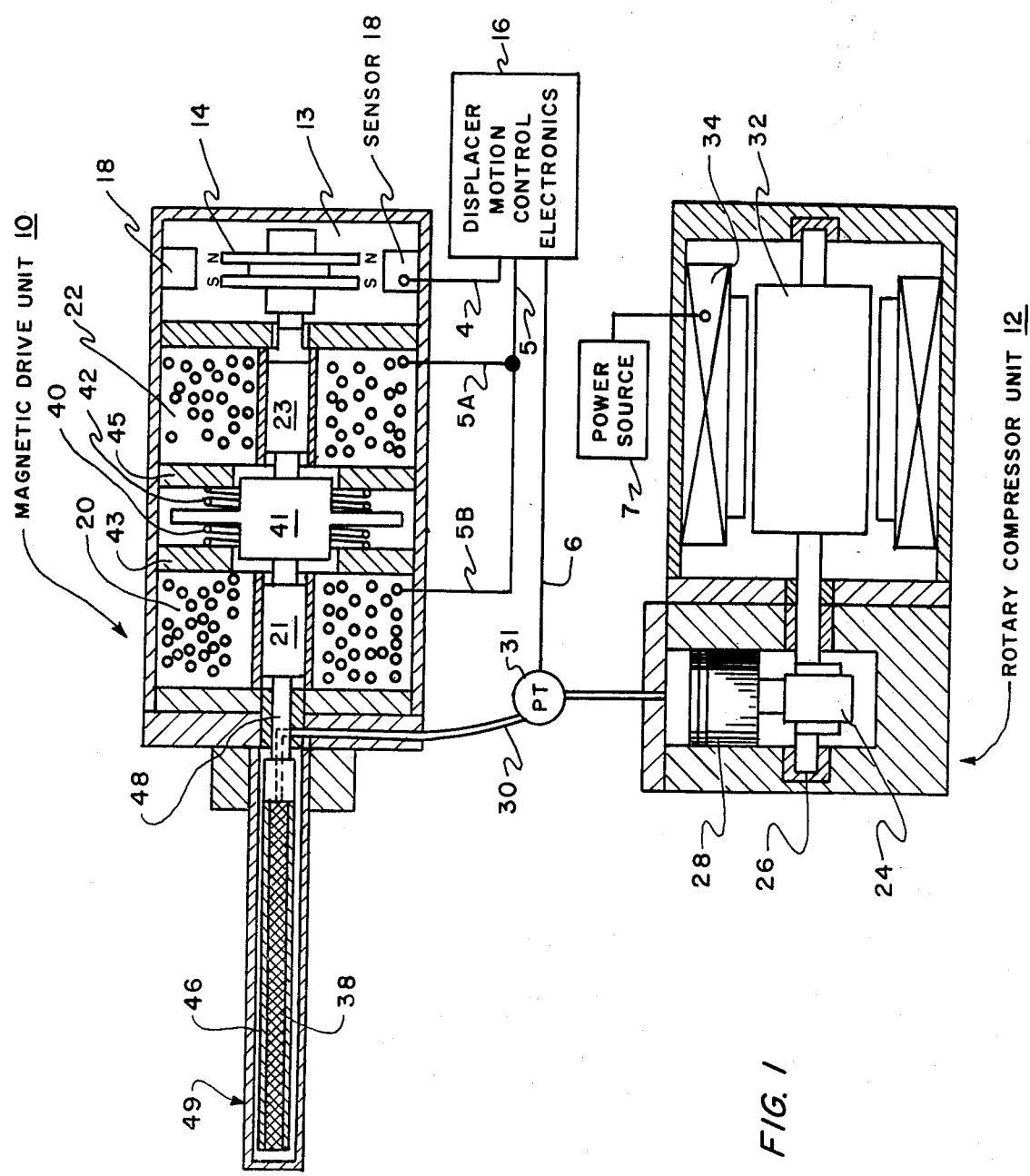
FIG. 1 illustrates a cut-away view of a cooler in which the present optimized efficiency waveform may be produced and practiced.
Figure 2:
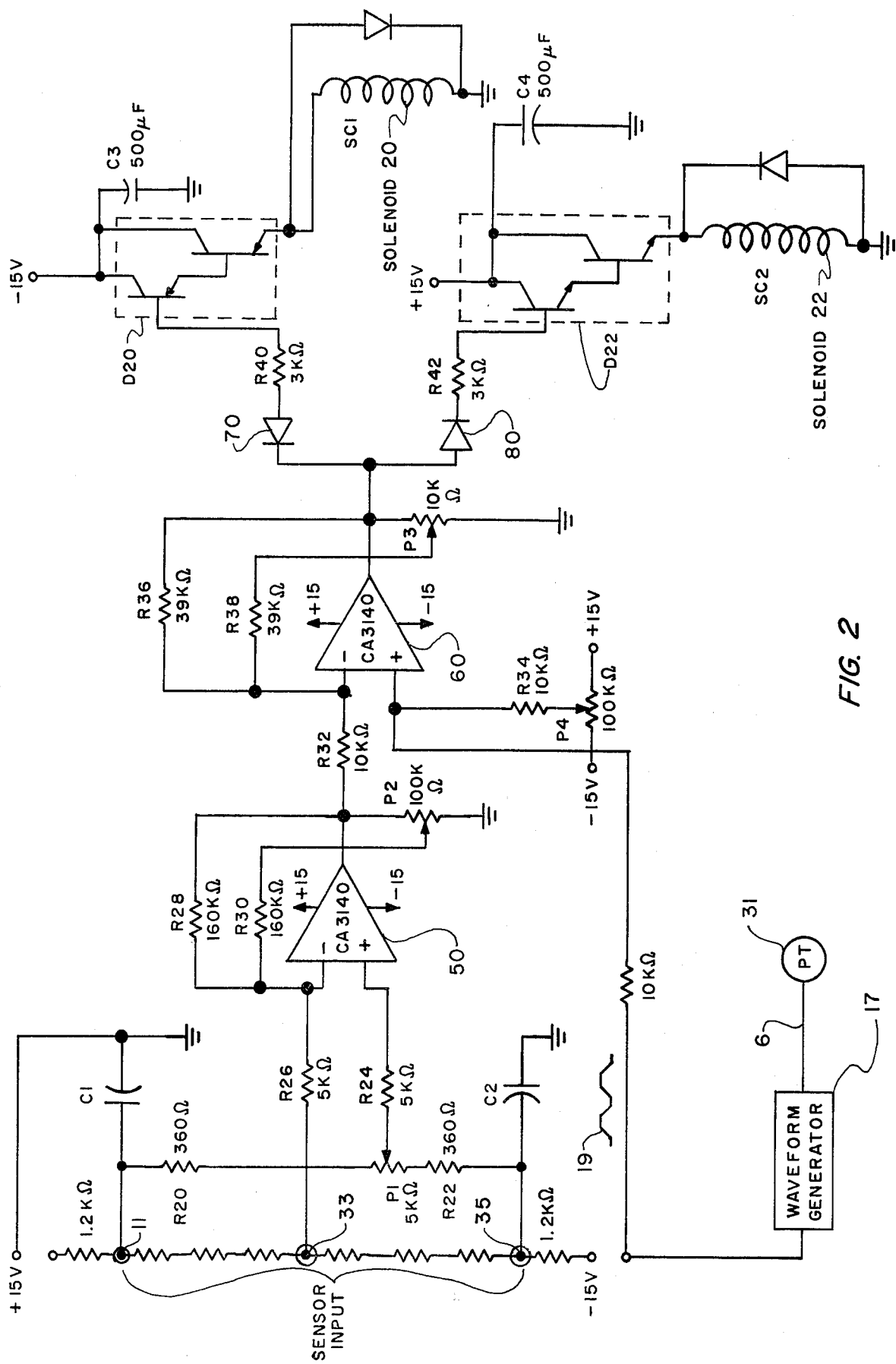
FIG. 2 is a schematic diagram of the control means comprising a displacer control drive circuit.
Figure 3:
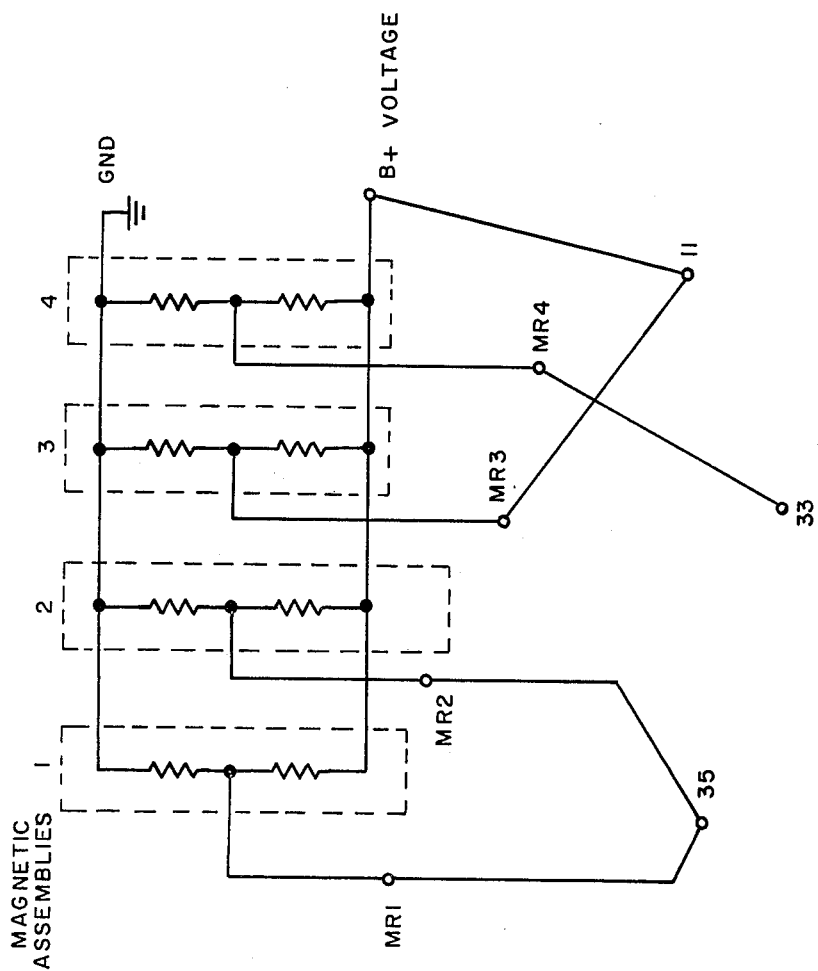
FIG. 3 illustrates a molded magnetoresistor sensor assembly.

Refer to FIGS. 1, 2, and 3 for an explanation of a typical split Stirling cycle closed cycle cryogenic cooler in which the present means for producing an optimized cooler expander waveform may be practiced. The optimized waveform producing means is comprised of a driving means in a magnetic drive unit 10 at the ambient end of cooler 49 for driving the shaft 48, which is in reality an extension of the displacer 46 having a regenerator matrix 38 therein. The waveform producing means is further comprised of a control means which is comprised of a displacer motion control electronics circuit 16, a pressure transducer 31 in the cooling gas feed line 30 which is activated by peak sinusoidal pressure from a rotary compressor unit 12 to trigger the waveform generator 17 into action by a signal along lead line 6, and a sensor 18 which senses the actual reciprocal motion of the magnetic slug 14 in the pneumatic spring volume 13 and which has North and South poles thereon for providing induced voltage waveforms to electronics circuit 16 along lead line 4 according to the actual movement of displacer 46.

The compressor means may be an electrically driven rotary type wherein its shaft 26 is rotated by motor 32 which is driven by electric current from a power source 7, of about 15 to 18 volts, with current circulating through coils 34 with a cam 24 reciprocating piston 28 to provide the regular sinusoidal pressure waves in the working gas within the enclosed area of the feed line 30 and within cooler 49.

The driving means within magnetic drive unit 10 is comprised of a magnetic driving means and spring biasing means which cooperatively move the displacer according to the control signals received from the control means. The magnetic driving means is comprised of a magnetic material disc 41 that is hard connected to the shaft 48 and which is positioned between two opposing solenoids 20 and 22 wherein current flow from the control means along lead lines 5B and 5A respectively activate solenoids 20 and 22. The spring biasing means is comprised of preferably two coil type springs 40 and 42 which are positioned respectively between annular wall sections 43 and 45 of unit 10 housing and magnetic material disc 41. Shaft 48 has cylindrical slugs of material 21 and 23 thereon that fit snugly against metal gaskets on the inside of solenoids 20 and 22 respectively to prevent any of the cooling gas from escaping from the cooling gas enclosed area into the pneumatic spring volume 13. When sufficient current flows through either of the solenoid coils, a magnetic flux is produced that acts on disc 41 to pull the disc toward the activated solenoid. Thus, looking at movement of displacer 46 on a one direction basis and using the initial current surge action of solenoid 20 as acceleration then the initial current surge action of coil 22 is the reciprocal movement, i.e. deceleration for displacer 46. Springs 40 and 42 should be strong enough yet flexible enough to hold during dwell time that the displacer 46 is held at the end of each stroke yet readily respond to solenoid action. The constant velocity is determined by the amount of surge current driven through each solenoid coil to initiate the short time interval of acceleration. The dwell time is provided by a constant flow of current for an extended time after the initial surge of current, thus holding the magnetic disc 41 and therefore the displacer 46 at the end of each stroke.

The control means controls the displacer motion into the optimized waveform pattern. A waveform generator 17, within the electronics curcuit 16, has a preprogrammed optimized waveform, designated by numeral 19, in FIGS. 2, 4, and 6, established therein which is generated therefrom when generator 17 receives a triggering peak voltage from a peak pressure pick up means, such as a pressure tranducer 31 in the working gas feed line 30. A second input to electronics circuit 16 comes from a sensor 18 within the pneumatic spring volume 13 of the magnetic drive unit 10 which senses the actual movement of displacer 46 by sensing the movement of the magnetic slug 14 which is affixed to shaft 48. Slug 14 has polarized North and South poles thereon whose movement within the doughnut shaped sensor is sensed by sensor 18. Sensor 18 provides voltage waveforms therefrom along lead line 4 to a balancing resistor network in electronics circuit 16. The sensor 18 could be a differential coil whose flux changes by movement of the magnetic slug 14 in close proximity thereto to provide magnetically induced voltage waveforms according to the actual motion of displacer 46.

However, the preferred sensing means is by a molded magnetoresistor sensor assembly as explained more fully herein below with reference to FIGS. 2 and 3. Initially the electronics circuit 16 drives solenoids 20 and 22 only in response to the preprogrammed optimized voltage waveform generated by generator 17. However, if after start up sensor 18 senses any misdirection of displacer motion as obtained by a differing waveform of the magnetically induced voltage waveform than that of the preprogrammed optimized voltage waveform then the displacer motion control electronics circuit 16 compares the two differently timed voltage waveforms and corrects by changing the amount and duration of current flow through the solenoids required to bring the actual movement of the displacer 46 back to preprogrammed optimized waveform pattern. It should be noted that each cooler system that is to be controlled has tests run first by driving the solenoids in the optimized waveform to see what the actual responses of the displacer are as sensed by sensor 18. The desired waveform is then programmed in the waveform generator 17 to drive the displacer with minimum correction.

FIG. 2 illustrates a displacer drive control circuit of the electronics circuit 16. The input signals from sensor 18 are received at terminal pins 11, 33, and 35 wherein pin 33 receives the main sensor, or sequential firing order, signal from the magnetic assembly #4 magnetoresistor, as shown in FIG. 3. The B+ voltage and a varying signal pickup in magnetic assembly #3 magnetoresistor are applied to pin 11, and the varying signals pickup up in magnetic assemblies #1 and #2 magnetoresistors is applied to pin 35. An adjustment potentiometer P1 is used to balance the resistor network, comprised of resistors R20, R22, and R24, between the +15 volts terminal and the −15 volts terminal so that the input magnetically induced voltage waveform is half above and half below the zero voltage line, i.e. such that any overrun on either the upper or lower side of the zero voltage line causes an input at the + post of amplifier 50. The input to the + post of amplifier 50 is however first nulled by use of P1 even before the sensor input is applied. The input to the − post of amplifier 50 is a balanced voltage from the main sensor or sequential firing magnetic assembly #4 of the magnetoresistor sensor assembly. The input to the + post of amplifier 50 is the varying voltage sensed by sensor 18 induced therein by actual reciprocal motion of displacer 46. Adjustment potentiometer P2 balances the dynamic output of amplifier 50 and provides a feedback loop through resistors R28 and R30 to control the gain. The output waveforms from 50, which are the sensor voltage waveforms indicating the actual instantaneous positions of displacer 46 as it reciprocally moves, are applied to the − post of amplifier 60. The optimized voltage waveform 19 from generator 17 are applied to the + post of amplifier 60. Adjustment potentiometers P4 and P3 respectively adjust the waveform 19 to the zero voltage line and balances the dynamic output and provide feedback through resistors R36 and R38 to amplifier 60 in exactly the same manner as P1 and P2 did to amplifier 50. Both feedback loops control the gain so that input variations produce a varying drive voltage at the output. Solenoid 20 is driven negative by the most negative portion of the combined output waveform from 60 passing through diode 70 wherein the negative portion initiates the activation of the Darlington drive circuit, represented as D20. Likewise, solenoid 22 is driven positive by the most positive portion of the combined output waveform from 60 passing through diode 80 with the positive portion initially activating the Darlington drive circuit D22.

Refer to FIG. 3 for a sensor means that may be used as the present sensor 18 for sensing movement of the magnetic slug 14 along with the displacer 46 and shaft 48. This sensor means uses magnetoresistance materials, i.e. transistor materials exhibiting a magnetoresistive effect wherein charges in an electrical resistance results in the transistor materials from the charging application of a magnetic field to the materials. Of the four magnetic assemblies, the MR4 bar of transistor material is aligned 180° out of phase within the circular or doughnut shaped sensor 18 from the MR1, MR2, and MR3 bars of transistor material such that pin 33 is always at opposite polarity from that of pins 11 and 35. As an explanation, MR4 is of North polarity when all the others of South polarity. As the magnetic slug 14, with the North and South poles thereon, is reciprocated with shaft 48 by solenoid action according to the optimized waveform, resistance of the MRs vary according to the magnetic flux lines from 14 directly associated with the many instantaneous positions of the shaft 48. The actual position of the displacer 46 is compared with the desired position in the second operational amplifier 60 after the sensed input is processed by the first operational amplifier 50.

Figure 4:
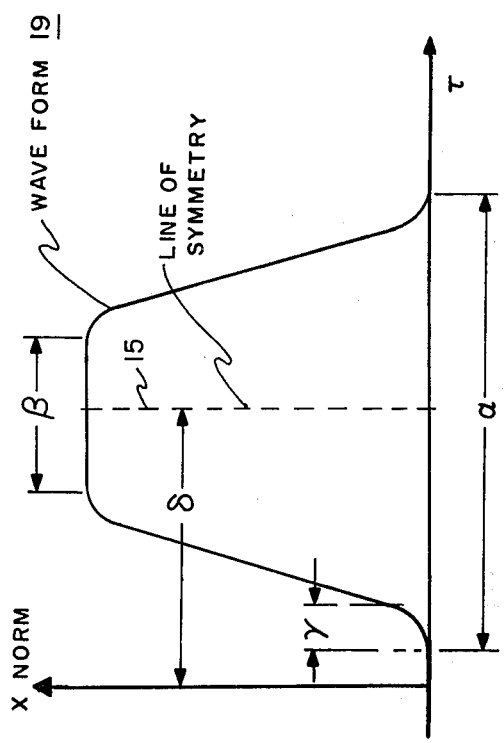
FIG. 4 is a time-distance diagram of the optimized expander waveform.
Figure 5A:
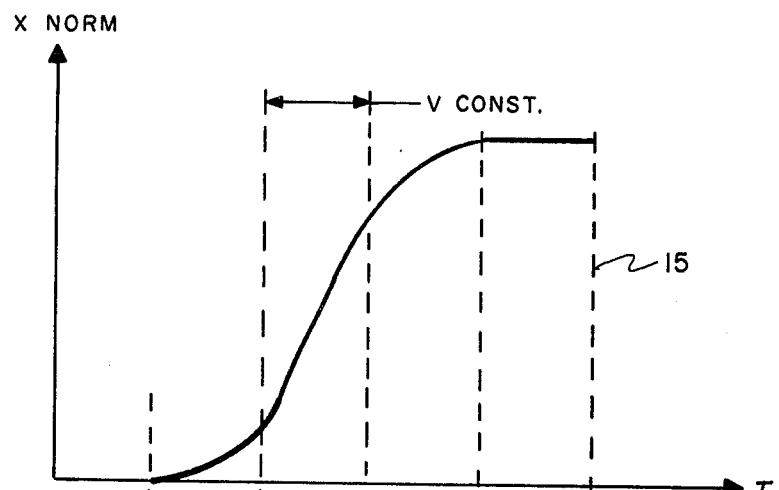
FIGS. 5A, 5B, and 5C show respectively one-half wave of the expander waveform, the velocity format of the displacer, and the constant acceleration of the displacer.
Figure 5B:
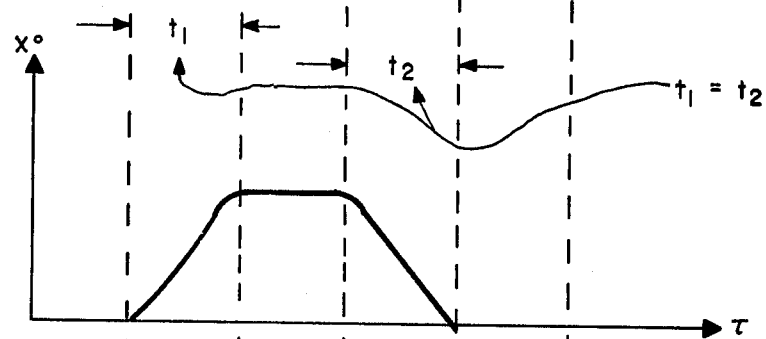
Figure 5C:
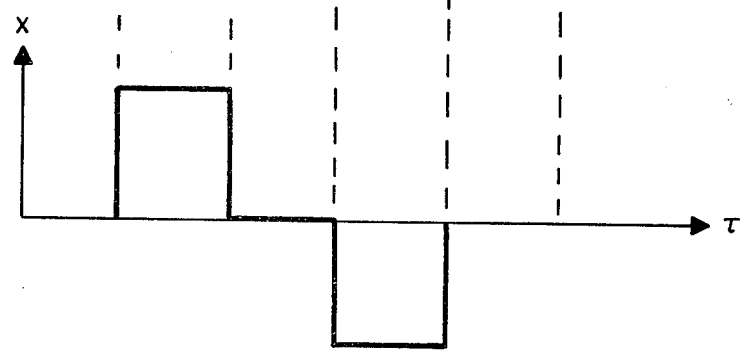

FIGS. 4, 5A, 5B, and 5C should now be referred to for explaining the desired formation of the optimized waveform characteristics as illustrated by time and distance of displacer movement. The waveform of FIG. 4 is defined by various parameters, i.e. $\alpha$, $\beta$, $\gamma$, and $\delta$, that have dimensions in time. Note that the lower dwell time is not extended out to be commensurate with the upper dwell time. The $\alpha$ parameter is a measure of the pulse waveform width. The $\beta$ parameter is a measure of the upper dwell time, and also the lower dwell time. The $\gamma$ parameter is a measure of the acceleration time. The $\delta$ parameter is a measure of the symmetry, i.e. the middle of the upper dwell time which is equivalent to the peak of a cosine wave. The $\tau$ parameter represents time, and the x NORM represents a normalized distance that the displacer travels as represented by the trace of one complete waveform during the time interval $\tau$. FIGS. 5A, 5B, and 5C show only half a waveform to illustrate the velocity diagram in FIG. 5B, i.e. whether the velocity is changing as during time intervals T1 or T2 or is constant as during the time interval between T1 and T2, or to illustrate the constant acceleration periods during the time T1 and the constant deceleration during the time T2. Note that even though the bends of half waveform in FIG. 5A are shown more exaggerated than in FIG. 4, the acceleration time $\gamma$ of FIG. 4 is the same as times T1 and T2 of FIG. 5A. That is, a constant acceleration time of the regenerator-displacer by a current surge in the solenoids of only aobut 1% of one total cycle of the optimized waveform is followed for about 25% of the optimized waveform by constant velocity to the next dwell time.

Further definitions of the parameters are as herein explained on a percentage basis,

| | | |
|---|---|---|
| % Pulse width | $= \alpha/\tau \times 100\%$ | (1) |
| % Dwell | $= B/\alpha \times 100\%$ | (2) |
| % Acceleration | $= \dfrac{\gamma}{\frac{1}{2}(\alpha - B)} \times 100\%$ | (3) |

-continued

| % Midpoint | = δ/τ × 100% either (+) or (−) | (4) |

The % Dwell Equation (2) is defined as the percentage of the total pulse width wherein the displacer dwells not the percentage of the cooler period that the displacer dwells. An operator can easily hold the ratio of the dwell time to the total pulse width, i.e. α, constant with the present cooler system arrangement, instead of having to go through a hand calculation to hold the total pulse width constant, as between the computer runs as shown by Table 1 herein below. Also, as long as the percentage of Dwell is held between zero and 100% the operator can never type in a timing parameter that could result in a top heavy waveform. The percentage acceleration is defined as the percentage of rise time that the displacer accelerates. Further, the precentage of rise time that the displacer accelerates is forced to be equal to the percentage of rise time that the displacer decelerates. The percentage midpoint is the location of the displacer waveform midpoint in non-dimensionalized form. The percentage midpoint of the wave is analogous to the phase angle of a cosine wave. By defining the phasing parameter of the pulse in terms of the midpoint of the pulse instead of the beginning of the pulse, waveforms having different pulse widths may be compared. Computer runs were made to test the preferred waveform shapes for obtaining the best COP. The waveforms were run having compressor sinusoidal pressure waves as an input to a three stage compressor. These runs are as shown in Table 1 below.

TABLE 1

| RUN NUMBER | PULSE WIDTH | DWELL | ACCELERATION | MIDPOINT | PHASE ANGLE |
|---|---|---|---|---|---|
| 1 | 75% | 33% | 1% | 5% | 101° |
| 2 | 50% | 33% | 1% | 5% | 101° |
| 3 | 90% | 33% | 1% | 5% | 101° |
| 4 | 75% | 25% | 1% | 5% | 101° |
| 5 | 75% | 40% | 1% | 5% | 101° |

The preferred waveform was actually found to be comprised of the following characteristics.

| PULSE WIDTH | DWELL | ACCELERATION | MIDPOINT | PHASE ANGLE |
|---|---|---|---|---|
| 75% | 33% | 1% | 5% | 90° |

Figure 6:
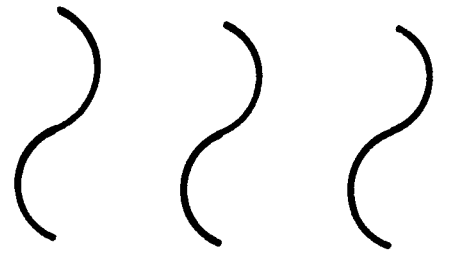
FIG. 6 illustrates three type expander motions and their corresponding cooling capacities.
Figure 6:
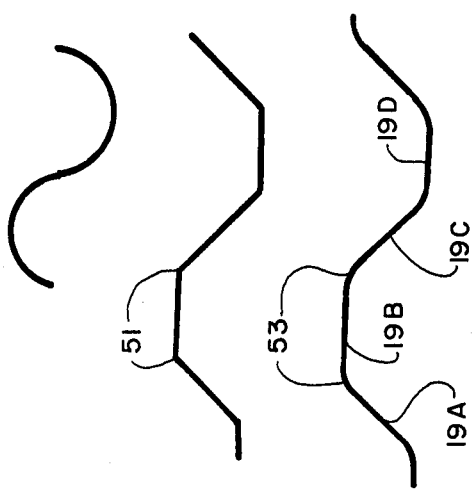

FIG. 6 illustrates the increased cooling capacity of a cooler operating at 77° K. with the expander waveform first being sinusoidal, then having constant velocity in opposite directions with dwell times therebetween, and with constant velocity in opposite directions and dwell times therebetween but with smoothed out transitions therebetween caused by the very short time intervals of acceleration and deceleration of the two solenoid magnetically controlled displacer-expander. The compressor motion waveform is the normal sinusoidal waveform in all instances. The upper transitions are shown as numeral 51 in the non-smoothed transitions and the smoothed out transitions are shown as numeral 53. The cooling capacity is clearly increased by the magnetically controlled expander motion into the constant velocities 19A and 19C in opposite directions and dwell times 19B and 19D. It is found that with each of the four portions 19A, 19B, 19C, and 19D being about 25% of the total cycle of the displacer and with the peak pressure of the compressor sinusoidal waveform being about 90° ahead of the line of symmetry 15 of the expander waveform as shown in TABLE 1, the most efficient waveform is produced.

TABLE 2 below shows the cooling powers in watts at different temperatures for the old sinusoidal waveforms and the new controlled waveforms and the input power needed for each of the three stage cooler.

TABLE 2

| TEMPERATURE | Cooling Power With Sinusoidal Motion (Watts) | Cooling Power With Constant Velocity Waveforms (Watts) |
|---|---|---|
| 10K | .33 | .41 |
| 25K | .17 | .31 |
| 162K | 0 | .29 |
| Input Power (Watts) | 49.5 | 54.7 |

COP improvement with constant velocities is about 13% @ 10K.

It can be seen that more power is required to drive the constant velocity waveforms with dwell times therebetween but the cooling power is increased so much that the increased overall efficiency provide a much improved cooler.

We claim:

1. A means for producing an optimized cooler expander waveform for a closed cycle cryogenic cooler having reciprocating displacer-expander cooling, said means comprising:

a driving means comprised of a combined magnetic drive means and a spring biasing means in the ambient end of said cooler for driving the displacer of said cooler, wherein said magnetic driving means is further comprised of a magnetic material disc which is hard connected to said displacer between two opposing solenoids and wherein said spring biasing means is comprised of two biasing springs with one on each side of said disc; and control means for selectively controlling said magnetic drive means wherein motion of said displacer is maintained in said optimized cooler expander waveform in which said two opposing solenoids provide control of said displacer in opposite directions according to the amount of current generated therethrough by said control means, said optimized cooler expander waveform having four portions thereto comprising about 25% each of one total cycle with a constant velocity of said displacer during the first portion of the forward stroke caused by surge current in said two opposing solenoids resulting in an acceleration time of about 1% of the total cycle, an upper flat dwell time second portion provided by extended current flow through said solenoids, an equal constant velocity of said displacer during the third portion of the return stroke caused by reverse and equal surge current with an acceleration time of about 1% of the total cycle, and a lower flat dwell time fourth portion provided by extended reverse current flow through said solenoids.

2. A means as set forth in claim 1 wherein said control means is comprised of a waveform generator within a displacer motion control electronics circuit preprogrammed to produce said optimized waveform when receiving a peak voltage trigger input thereto from a peak pressure pickup means in a working gas feed line having sinusoidal pressure waves therein between a compressor means and said cooler and another input from a sensor positioned in the spring volume of the ambient end of said cooler for producing magnetically induced voltage waveforms according to the actual motion of said displacer wherein said displacer motion control electronics circuit drives said two opposing solenoids according to said optimized waveform from said waveform generator and corrects for any displacer misdirection by comparing said input magnetically induced voltage waveforms from said sensor to said optimized waveforms to change the amount of current flow in the effected solenoids for changing the speed of acceleration of said displacer to synchronize said displacer motion with said sinusoidal pressure waves wherein the peak of the sinusoidal pressure wave leads the line of symmetry of said upper flat dwell time portion of said optimized efficiency waveform by 90°.

3. A means as set forth in claim 2 wherein said waveform generator is a function generator or a breadboarded signal generator.

4. A means as set forth in claim 3 wherein said sensor is comprised of a molded magnetoresistor sensor assembly encircling said spring volume in close proximity to a displacer shaft mounted magnetic slug having a N-pole polarity and a S-pole polarity thereon for providing change in electrical resistance across each of a plurality of transistor material magnetoresistors with the reciprocal motion of said displacer changing the magnetic field across each of said plurality of magnetoresistors to provide said voltage waveforms therefrom.

5. A means as set forth in claim 3 wherein said sensor is comprised of a differential coil in close proximity to a displacer shaft mounted magnetic slug having a N-pole polarity and a S-pole polarity thereon for providing a differential voltage output therefrom with the reciprocal motion of said displacer to provide said voltage waveforms therefrom.

6. A means as set forth in claim 4 wherein said displacer motion control electronics circuit is further comprised of a first operational amplifier that receives as one input a balanced voltage for the sensed input voltage waveforms from said sensor and as a second input the varying voltage sensed by said sensor as induced therein by actual reciprocal motion of said displacer and a second operational amplifier having as one input the output of said first operational amplifier and as a second input the optimized waveform from said waveform generator wherein the sensed output from said sensor and said optimized waveform are compared therein with the combined output waveform from said second operational amplifier being applied to said two opposing solenoids to drive said displacer in accordance with said optimized waveform and any correction from said sensor voltage waveform being different from said optimized waveform.

* * * * *